(No Model.)  
2 Sheets—Sheet 1.

H. P. HURST.
CHILD'S COPY BOOK.

No. 310,515. Patented Jan. 6, 1885.

Attest:  
A. P. Knight  
Geo. L. Wheelock

Inventor  
H. Priuli Hurst  
By Knight Bros.  
Attys.

(No Model.) 2 Sheets—Sheet 2.

H. P. HURST.
CHILD'S COPY BOOK.

No. 310,515. Patented Jan. 6, 1885.

Attest:
A. P. Knight
Geo. L. Wheelock

Inventor:
H. Priule Hurst,
By Knight Bro.
Attys.

UNITED STATES PATENT OFFICE.

H. PRIULI HURST, OF NEWPORT, KENTUCKY.

CHILD'S COPY-BOOK.

SPECIFICATION forming part of Letters Patent No. 310,515, dated January 6, 1885.

Application filed July 29, 1884. (No model.)

*To all whom it may concern:*

Be it known that I, H. PRIULI HURST, of Newport, Campbell county, Kentucky, have invented a new and useful series or system of Children's Copy-Books, of which the following is a specification.

My invention relates to a series or system of movable and reversible copy compends for the use of school children, in which the matter is so arranged on the consecutive pages as to be always presented to the learner on the, for the time being, right-hand page, this being accomplished by printing the matter on the odd and on the even pages consecutively upside down with reference to one another. Preferably associated with this feature are the combination of lessons in drawing with lessons in writing, or in composition, &c., either on the same or on consecutive pages, and other features hereinafter explained.

Figure 5:
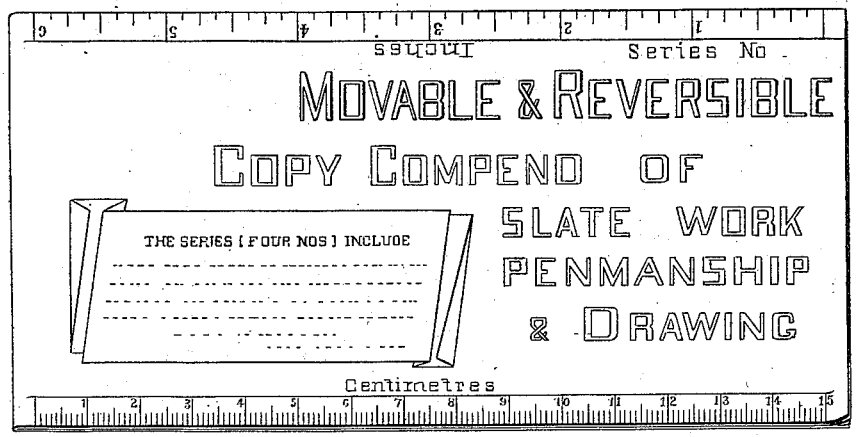

My invention is illustrated in the accompanying Figures 1, 2, 3, and 4 by representations of copy-books of four successive grades, such as used in my system, said books being opened at random. Fig. 5 represents the title-page of the primer-book of my series.

Figure 1:
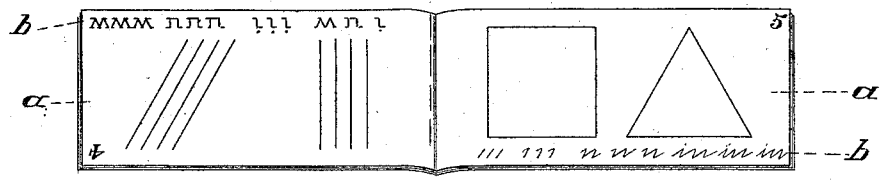
Figure 2:
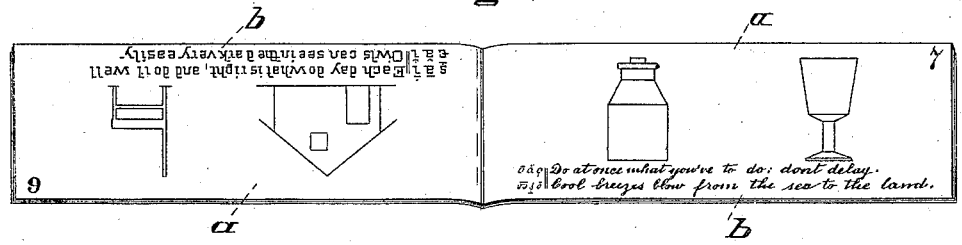
Figure 3:
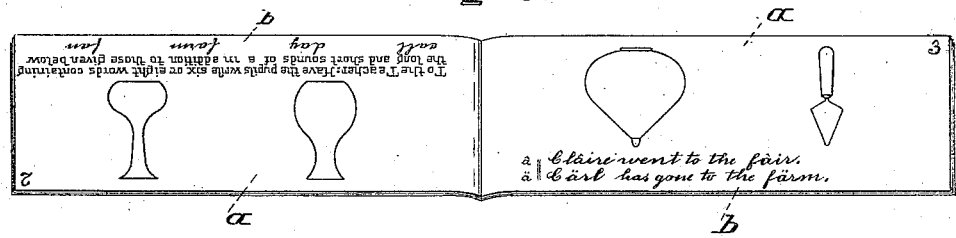
Figure 4:
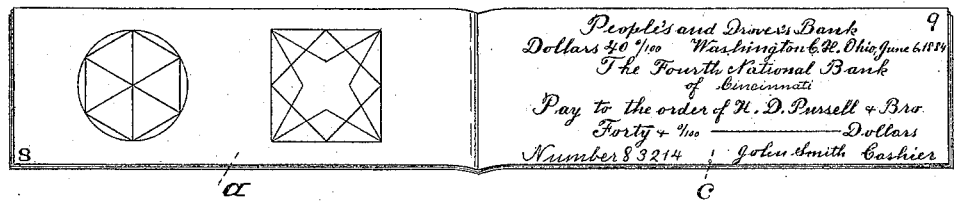

Fig. 1 represents the primer number, in which each page contains, near its foot, a simple exercise in penmanship, and in the space above this a lesson or copy in right lines.

The matter on each page is seen to be so arranged as to present said page, when in use, to the pupil's right hand, the page not then in use being to his left hand, so as to be conveniently grasped by said left hand, and the book to be held in position upon the sheet on which the copy is being made, and to be moved or shifted from time to time down said sheet, so as to always present to the pupil's eye the very lesson to be copied rather than his own (more or less) imperfect work. The arrangement on each page or upon each alternate page of a simple drawing lesson or exercise in lines and diagrams, *a*, along with a lesson in penmanship or composition, *b*, imparts that variety to the work which is best calculated to make it easy to the learner and to facilitate his progress both in writing and drawing. The lessons are preferably so graded as to gradually accustom the pupil to transcription of Roman or Italic characters into script, and vice versa, and (while acquiring skill in penmanship) to instruct him in diacritical marks, abbreviations, &c., and to familiarize him with various business and social forms of writing. (See, for example, form *c* in Fig. 4.) From first lesson throughout the series, each lesson in penmanship or written forms is accompanied by one in drawing. The lessons in book 1 are more especially intended for use with the slate, and may for that purpose consist of white lines on a black or shaded ground. The lessons in subsequent books will be by black lines on a white ground, and are intended for use on blank paper. One or more of the primary books have, following each lesson in script, similar letters and words in print or Roman characters, arranged in a different order from the preceding lesson, for the pupil to translate or change from the printed character into script. One or more diacritical letters are given at commencement of a line or sentence, as a key-letter in Nos. 2 and 3 books, and that sound in the sentence therein given is similarly marked to the key-letter. The lesson with marked words and letters may be followed by lessons which contain words of the same vowel or consonant sounds, but which are unmarked, leaving the pupil to mark them from memory from the preceding marked sentences. The lessons may include illustrations of definitions, abbreviations, &c., ending with epistolary exercises or correspondence, &c. For district or mixed schools, the series may be furnished in assorted lots, in cabinets containing as many compartments as there are respective books—as, for example, four for the series here illustrated. For city or graded schools employing large numbers of one kind, each cabinet may contain one kind of book.

The lessons of the various books may be published in detached sheets put up in convenient envelopes or packages, with a specimen page on the outside. The lessons may contain business and social forms, such as receipts, notes, checks, drafts, telegrams, invitations, &c. The system of drawing employed in these lessons is preferably based on the unit measurement of one-eighth of an inch and multiples thereof, and fits in with the system of ruled lines for penmanship, they being preferably drawn one-eighth of an inch apart, the smaller letters being one-eighth of an inch in height. Similarly, the diagrams and drawings in their distance from one another and of the component parts are preferably divisible by like measurements.

The front or title page of one or more of the books is marked on its top and bottom edges with scales of inches and centimeters, respectively, each scale being so arranged as to read by presenting the edge nearest it next the eye, so that the pupil can apply the scale directly to his work, and thereby test its accuracy and at the same time familiarize himself with measurements. (See Fig. 5.)

The above-described expedients for familiarizing the mind and eye of the student with specific measurements and the practice of drawing and writing to scale, being subject-matter of a distinct application for patent, filed December 29, 1884, are not claimed here.

I claim as new and of my invention—

1. A child's copy-book in which the lesson on each page is inverted relatively to that on the reverse page of the same leaf, as and for the purpose set forth.

2. A system or series of copy-books with reversely-presented consecutive pages, substantially as and for the purpose set forth.

In testimony of which invention I hereunto set my hand.

H. PRIULI HURST.

Attest:
 GEO. H. KNIGHT,
 CHAS. E. PRIOR.